(12) United States Patent
Robbins, Jr. et al.

(10) Patent No.: US 7,661,586 B2
(45) Date of Patent: Feb. 16, 2010

(54) SYSTEM AND METHOD FOR PROVIDING A CREDIT CARD WITH BACK-END PAYMENT FILTERING

(75) Inventors: John J. Robbins, Jr., Little Rock, AR (US); John J. Robbins, Sr., Little Rock, AR (US); Glen A. Hoffman, Conway, AR (US)

(73) Assignee: DataPath, Inc., Little Rock, AR (US)

( * ) Notice: Subject to any disclaimer, the term of this patent is extended or adjusted under 35 U.S.C. 154(b) by 503 days.

(21) Appl. No.: 10/980,102

(22) Filed: Nov. 1, 2004

(65) Prior Publication Data
US 2005/0121511 A1    Jun. 9, 2005

Related U.S. Application Data

(60) Provisional application No. 60/516,648, filed on Oct. 30, 2003.

(51) Int. Cl.
*G06K 5/00* (2006.01)
(52) U.S. Cl. .............................. 235/380; 705/1; 705/2; 705/4; 705/30; 705/35; 705/38; 705/39; 705/40
(58) Field of Classification Search ................. 235/380; 705/1, 2, 4, 30, 35, 38–40
See application file for complete search history.

(56) References Cited

U.S. PATENT DOCUMENTS

| 4,491,725 | A | 1/1985 | Pritchard |
| 4,858,121 | A | 8/1989 | Barber et al. |
| 5,235,507 | A | 8/1993 | Sackler et al. |
| 5,301,105 | A | 4/1994 | Cummings, Jr. |
| 5,359,509 | A | 10/1994 | Little et al. |
| 5,521,363 | A | 5/1996 | Tannenbaum |
| 5,559,313 | A | 9/1996 | Claus et al. |
| 5,590,038 | A | 12/1996 | Pitroda |
| 5,644,778 | A | 7/1997 | Burks et al. |
| 5,649,115 | A | 7/1997 | Schrader et al. |
| 5,842,185 | A | 11/1998 | Chancey et al. |
| 5,857,079 | A | 1/1999 | Claus et al. |
| 5,930,759 | A | 7/1999 | Moore et al. |
| 5,966,693 | A | 10/1999 | Burgess |
| 5,991,750 | A | 11/1999 | Watson |
| 6,115,458 | A | 9/2000 | Taskett |
| 6,208,973 | B1 | 3/2001 | Boyer et al. |
| 6,343,271 | B1 | 1/2002 | Peterson et al. |
| 6,343,279 | B1 | 1/2002 | Bissonette et al. |

(Continued)

FOREIGN PATENT DOCUMENTS

JP    2000348099    12/2000

(Continued)

*Primary Examiner*—Allyson N Trail

(57) ABSTRACT

A credit card transaction processing system that, in various embodiments, is configured for: (1) receiving transaction data related to a reimbursable charge made on the credit card by a credit card holder; (2) analyzing the transaction data to determine whether the charge may be auto-substantiated; (3) in response to determining that the charge may be auto-substantiated, auto-substantiating the charge; and (4) in response to the charge being auto-substantiated, reimbursing the credit card holder for at least a portion of the charge at least substantially without human intervention.

59 Claims, 19 Drawing Sheets

U.S. PATENT DOCUMENTS

| | | | |
|---|---|---|---|
| 6,418,420 B1 | 7/2002 | DiGiorgio et al. | |
| 6,422,462 B1 | 7/2002 | Cohen | |
| 6,442,526 B1 | 8/2002 | Vance et al. | |
| 7,174,302 B2 * | 2/2007 | Patricelli et al. | 705/4 |
| 7,197,468 B1 * | 3/2007 | Patricelli et al. | 705/4 |
| 2001/0051917 A1 | 12/2001 | Bissonette et al. | |
| 2003/0036918 A1 * | 2/2003 | Pintsov | 705/1 |
| 2003/0074311 A1 * | 4/2003 | Saylors et al. | 705/39 |
| 2003/0088487 A1 | 5/2003 | Cheng et al. | |
| 2003/0197058 A1 | 10/2003 | Benkert et al. | |
| 2005/0033677 A1 * | 2/2005 | Birdsong et al. | 705/35 |
| 2005/0222944 A1 * | 10/2005 | Dodson et al. | 705/39 |

FOREIGN PATENT DOCUMENTS

| | | |
|---|---|---|
| JP | 2001 350892 | 12/2001 |
| JP | 2002312554 | 10/2002 |
| WO | WO 99/66460 | 12/1999 |

* cited by examiner

| | Card Holder | Statement Date | Due Date | Amount Due |
|---|---|---|---|---|
| Yes No | | DataPath, Inc. | | |
| ⦿ ○ | BARI J. WRIGHT | 11/23/2003 | 12/18/2003 | $64.14 |
| ⦿ ○ | BENJAMIN ROBBINS | 11/23/2003 | 12/18/2003 | $54.81 |
| ⦿ ○ | GLEN HOFFMAN | 11/23/2003 | 12/18/2003 | $6.95 |
| ⦿ ○ | JASON LEE | 11/23/2003 | 12/18/2003 | $58.43 |
| ⦿ ○ | JOHN J ROBBINS JR | 11/23/2003 | 12/18/2003 | $10.43 |
| ⦿ ○ | KAY ROBBINS | 11/23/2003 | 12/18/2003 | $69.96 |
| | | | Page Total | $264.72 |

Statement Search

Statement Date Filter: 11/23/2003
Employer Filter: DataPath, Inc.
Card Holder Filter: All Card Holders

FIGURE 7

| | Account Holder | Account Number | Statement Amount Due | Current Payments | Remaining Due | Current Status | Next Status | Block Reason |
|---|---|---|---|---|---|---|---|---|
| DataPath, Inc. Last Statement Date: 8/22/2004 Payment Due Date: 9/16/2004 Days Remaining: 21 | | | | | | | | |
| 1. | AARON DERGAZARIAN | 8998064722 | $200.11 | $0.00 | $200.11 | Current | 1 mo. Delinquent | |
| 2. | BAKER BUSH | 8283499062 | $60.43 | $7.28 | $53.15 | Current | 1 mo. Delinquent | |
| 3. | BARI J. WRIGHT | 8389334940 | $667.22 | $0.00 | $667.22 | Current | 1 mo. Delinquent | |
| 4. | BENJAMIN ROBBINS | 8596061625 | $325.60 | $200.00 | $125.60 | Current | 1 mo. Delinquent | |
| 5. | CARRIE STOUT | 8504681530 | $334.99 | $334.99 | $0.00 | Paid | Current | |
| 6. | CHARLES BEALS | 8066844534 | $1,064.82 | $1,086.68 | $0.00 | Paid | Current | |
| 7. | CHARLES ROBBINS | 8272514533 | $210.67 | $0.00 | $210.67 | Current | 1 mo. Delinquent | |
| 8. | CHARLOTTE BONNELL | 8189612115 | $166.32 | $16.32 | $150.00 | Current | 1 mo. Delinquent | |
| 9. | CHEMEKA COOPER | 8863633320 | $52.65 | $52.65 | $0.00 | Paid | Current | |
| 10. | JASON LEE | 8239568655 | $312.83 | $0.00 | $312.83 | Current | 1 mo. Delinquent | |
| 11. | JEANNIE LEE | 8514286668 | $383.23 | $30.00 | $353.23 | Current | 1 mo. Delinquent | |
| 12. | JOHN J ROBBINS JR | 8447452882 | $49.54 | $0.00 | $49.54 | Current | 1 mo. Delinquent | |

| xxxx-xxxx-xxxx-1845 | Bari J Wright | DataPath, Inc. |

Account Summary

Make Changes to My Account

| Account Information | | Account Summary | |
|---|---|---|---|
| Card Holder(s): | ☐ Bari J Wright | Account Number: | 8389334940 |
| | ☐ Dayna M Garcia | Credit Line: | $1,200.00 |
| | ☐ Andrew I Sinde-Wright | Current Balance: - | $598.14 |
| | ☐ John C Wright | Authorizations: - | $496.30 |
| Customer Number: | 7398291943 | Available Credit: | $105.56 |
| Send Paper Statement: | No | | |
| Billing Email: | bwright@dpath.com | Payment Due | |
| Billing Address: | 123 Anystreet | Minimum Payment (Due 9/16/2004): $553.94 | |
| | Little Rock, AR 72211 | | |
| Home Phone: | 999-555-1212 | | |
| Work Phone: | | | |
| Block Code 1: | None | | |
| Block Code 2: | None | | |

FIGURE 11

| xxxx-xxxx-xxxx-1845 | Bari J Wright | DataPath, Inc. |
|---|---|---|

Recent Activity

Bari J Wright (Account) ⌄

Posted Transactions

| | Post Date | Effective Date | Reference Number | Description | Amount |
|---|---|---|---|---|---|
| Details | 8/23/2004 | 8/20/2004 | MT0423601060000010000005 | KROGER #615 SL9 LITTLE ROCK AR | $7.51 |
| Details | 8/23/2004 | 8/21/2004 | MT0423601040000010000020 | SHOGUN JAPANESE STEAKH LITTLE ROCK AR | $20.00 |
| Details | 8/25/2004 | 8/23/2004 | MT0423800930000010000009 | SHELL OIL 93002480709 LITTLE ROCK AR | $5.19 |
| Details | 8/25/2004 | 8/23/2004 | MT0423900930000010000010 | SHELL OIL 93002480709 LITTLE ROCK AR | $10.50 |
| Details | 8/26/2004 | 8/26/2004 | 0999999980826200010071 | PAPER CHECK PAYMENT FEE | $1.00 |
| Details | 8/26/2004 | 8/26/2004 | 0999999980826100010189 | PAYMENT - THANK YOU. | ($92.45) |
| Details | 8/26/2004 | 8/26/2004 | 0999999980826100010197 | PMT FOR INDOWNED CLAIM # 442579 | ($20.83) |
| | | | | Total Recent Activity | ($69.08) |
| | | | | Previous Balance | $667.22 |
| | | | | Current Balance | $598.14 |

7 Posted Transaction(s) found

Pending Transactions

| Transaction Date | Authorization Code | Description | Amount |
|---|---|---|---|
| 8/25/2004 | O98457 | PURCHASE | $410.48 |
| 8/25/2004 | T98572 | PURCHASE | $85.82 |
| | | Total Pending Transactions | $496.30 |

2 Pending Transaction(s) found

Benefits  Contacts

Commercial Printing

Change Role    Logout

You are logged in as Bill Baker,
Employee for Commercial Printing (97864402)

- Home
- EOB Summaries
- Benefit Plans
- Reimbursement Accounts
- COBRA Benefit History
- Calculators
- Enrollment
- Documents
- Forms
- Health Services
- Life Events
- Q & A

FSA Benefit History for Bill Baker

Currently viewing plan year ending
12/31/2003

Last updated: 10/30/2004 4:31:53 AM

FSA Dependent Care

| | |
|---:|---:|
| Current Annual Election | $4,800.00 |
| YTD Deposit | $1,400.00 |
| YTD Claims | $4,800.00 |
| YTD Paid | $1,200.00 |
| Credit Available | $200.00 |
| Account Balance | $200.00 |
| | Detail |

FSA Medical

| | |
|---:|---:|
| Current Annual Election | $2,400.00 |
| YTD Deposit | $725.00 |
| YTD Claims | $256.00 |
| YTD Paid | $175.00 |
| Credit Available | $2,225.00 |
| Account Balance | $550.00 |
| | Detail |

Privacy Statement | Terms of Service

FIGURE 16

Benefits   Contacts                                      Commercial Printing
                                                              Change Role    Logout

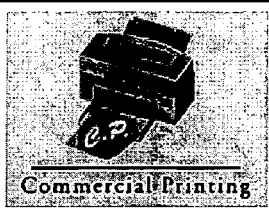

You are logged in as Bill Baker,
Employee for Commercial Printing (97864402)

FSA Benefit History Detail for Bill Baker

Currently viewing plan year ending         Last updated: 10/30/2004 4:31:53
12/31/2003                                                              AM

- Home
- EOB Summaries
- Benefit Plans
- Reimbursement Accounts
- COBRA Benefit History
- Calculators
- Enrollment
- Documents
- Forms
- Health Services
- Life Events
- Q & A < View Reimbursements >

Claims for FSA Dependent Care

| Claim Number | From | To | Claim Amount | Paid to Date | Remarks |
|---|---|---|---|---|---|
| 396138 | 12/27/2003 | 12/27/2003 | $200.00 | $0.00 | daycare |
| 396137 | 12/15/2003 | 12/15/2003 | $200.00 | $0.00 | daycare |
| 396136 | 11/27/2003 | 11/27/2003 | $200.00 | $0.00 | daycare |
| 396135 | 11/15/2003 | 11/15/2003 | $200.00 | $0.00 | daycare |
| 396134 | 10/27/2003 | 10/27/2003 | $200.00 | $0.00 | daycare |
| 396133 | 10/15/2003 | 10/15/2003 | $200.00 | $0.00 | daycare |
| 396132 | 09/27/2003 | 09/27/2003 | $200.00 | $0.00 | daycare |
| 396131 | 09/15/2003 | 09/15/2003 | $200.00 | $0.00 | daycare |
| 396130 | 08/27/2003 | 08/27/2003 | $200.00 | $0.00 | daycare |
| 396129 | 08/15/2003 | 08/15/2003 | $200.00 | $0.00 | daycare |
| 396078 | 07/27/2003 | 07/27/2003 | $200.00 | $0.00 | daycare |
| 396077 | 07/15/2003 | 07/15/2003 | $200.00 | $0.00 | daycare |
| 396076 | 06/27/2003 | 06/27/2003 | $200.00 | $0.00 | daycare |
| 396075 | 06/15/2003 | 06/15/2003 | $200.00 | $0.00 | daycare |
| 396074 | 05/27/2003 | 05/27/2003 | $200.00 | $0.00 | daycare |
| 396073 | 05/15/2003 | 05/15/2003 | $200.00 | $0.00 | daycare |
| 396072 | 04/27/2003 | 04/27/2003 | $200.00 | $0.00 | daycare |
| 396071 | 04/15/2003 | 04/15/2003 | $200.00 | $0.00 | daycare |
| 396070 | 03/27/2003 | 03/27/2003 | $200.00 | $200.00 | daycare |
| 396069 | 03/15/2003 | 03/15/2003 | $200.00 | $200.00 | daycare |
| 396068 | 02/27/2003 | 02/27/2003 | $200.00 | $200.00 | daycare |
| 396067 | 02/15/2003 | 02/15/2003 | $200.00 | $200.00 | daycare |
| 396066 | 01/27/2003 | 01/27/2003 | $200.00 | $200.00 | daycare |
| 396047 | 01/15/2003 | 01/15/2003 | $200.00 | $200.00 | daycare |

Back to Top

< View Reimbursements >

Claims for FSA Medical

| Claim Number | From | To | Claim Amount | Paid to Date | Remarks |
|---|---|---|---|---|---|
| 414113 | 12/12/2003 | 12/12/2003 | $56.00 | $0.00 | Allergy |
| 396119 | 07/10/2003 | 07/10/2003 | $25.00 | $0.00 | |
| 396058 | 03/01/2003 | 03/01/2003 | $125.00 | $125.00 | Hospital |
| 396048 | 01/17/2003 | 01/17/2003 | $50.00 | $50.00 | |

FIGURE 17

Back to Top

Reimbursements

| | Payment Number | Claim Numbers | Payment Date | Payment Type | Amount Paid |
|---|---|---|---|---|---|
| [Detail] | – | 396058, 396069, 396070 | 04/15/2003 | Direct Deposit | $525.00 |
| [Detail] | – | 396068 | 02/28/2003 | Direct Deposit | $200.00 |
| [Detail] | – | 396067 | 02/15/2003 | Direct Deposit | $200.00 |
| [Detail] | – | 396048, 396066 | 01/31/2003 | Direct Deposit | $250.00 |
| [Detail] | – | 396047 | 01/15/2003 | Direct Deposit | $200.00 |

Back to Top

<< Back

Privacy Statement | Terms of Service

FIGURE 18

Benefits   Contacts

Commercial Printing

Change Role   Logout

You are logged in as Bill Baker,
Employee for Commercial Printing (97864402)

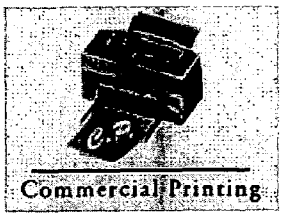
Commercial Printing

- Home
- EOB Summaries
- Benefit Plans
- Reimbursement Accounts
- COBRA Benefit History
- Calculators
- Enrollment
- Documents
- Forms
- Health Services
- Life Events
- Q & A

Transportation Account History for Bill Baker

Currently viewing plan year ending
12/31/2002

Last updated: 10/30/2004 4:31:53 AM

Transit Conversion

| | |
|---:|---:|
| Current Annual Election | $780.00 |
| YTD Deposit | $75.00 |
| YTD Claims | $0.00 |
| YTD Paid | $0.00 |
| Credit Available | $75.00 |
| Account Balance | $75.00 |
| | Detail |

Transit Reimbursement

| | |
|---:|---:|
| Current Annual Election | $780.00 |
| YTD Deposit | $75.00 |
| YTD Claims | $300.00 |
| YTD Paid | $40.00 |
| Credit Available | $35.00 |
| Account Balance | $35.00 |
| | Detail |

Parking Conversion

| | |
|---:|---:|
| Current Annual Election | $1,300.00 |
| YTD Deposit | $125.00 |
| YTD Claims | $0.00 |
| YTD Paid | $0.00 |
| Credit Available | $125.00 |
| Account Balance | $125.00 |
| | Detail |

Parking Reimbursement

| | |
|---:|---:|
| Current Annual Election | $2,159.56 |
| YTD Deposit | $207.65 |
| YTD Claims | $740.00 |
| YTD Paid | $85.00 |
| Credit Available | $122.65 |
| Account Balance | $122.65 |
| | Detail |

Privacy Statement | Terms of Service

FIGURE 19

SYSTEM AND METHOD FOR PROVIDING A CREDIT CARD WITH BACK-END PAYMENT FILTERING

CROSS-REFERENCE TO RELATED APPLICATIONS

This application claims priority from U.S. provisional patent application No. 60/516,648 entitled "System and Method for Providing a Credit Card with Back-End Payment Filtering," which was filed on Oct. 30, 2003 and which is hereby incorporated by reference.

BACKGROUND OF THE INVENTION

Currently, it is common practice for an individual to use a credit card to make reimbursable purchases such as reimbursable health care or business-related purchases. For example, an individual can use their credit card to pay a co-payment for a medical checkup that is reimbursable from the individual's flexible spending account, or to purchase tickets for reimbursable employment-related travel. In order to obtain reimbursement for such purchases, the individual must typically fill out an appropriate paper form and submit it, along with proper substantiating documentation, to an appropriate entity such as a flexible spending account administrator. This process is often difficult and time consuming. Accordingly, an improved reimbursement system is needed to make it easier to obtain reimbursement payments for reimbursable purchases.

BRIEF SUMMARY OF THE INVENTION

A credit card transaction processing system according to one embodiment of the invention is configured for: (1) receiving transaction data related to a reimbursable charge made on the credit card by a credit card holder; (2) analyzing the transaction data to determine whether the charge may be auto-substantiated; (3) in response to determining that the charge may be auto-substantiated, auto-substantiating the charge; and (4) in response to the charge being auto-substantiated, reimbursing the credit card holder for at least a portion of the charge at least substantially without human intervention.

A credit card transaction processing system according to a further embodiment of the invention is configured for: (1) receiving transaction information regarding a credit card transaction related to a reimbursable charge made on a credit card by a credit card holder; (2) determining that the credit card transaction would qualify for reimbursement from a first account; (3) determining that the credit card transaction would also qualify for reimbursement from a second account; and (4) determining, based at least in part on the transaction information, to reimburse at least a portion of the credit card transaction from the first account.

A credit card transaction processing system according to yet another embodiment of the invention is configured for processing transactions made on a credit card that is issued to a cardholder and guaranteed by the cardholder's employer.

BRIEF DESCRIPTION OF THE FIGURES

FIG. 7 depicts a Statement Search Screen according to one embodiment of the invention.

FIG. 8 depicts a Delinquent Account Search Screen according to one embodiment of the invention.

FIG. 10 depicts a Pay My Bill Screen according to one embodiment of the invention.

FIG. 11 depicts a Account Summary Screen according to one embodiment of the invention.

FIG. 12 depicts a Recent Activity Screen according to one embodiment of the invention.

FIG. 15 depicts a Reimbursement Account Summary Screen according to one embodiment of the invention.

FIG. 16 depicts an FSA Benefit History Screen according to one embodiment of the invention.

FIG. 17 depicts an FSA Benefit History Detail Screen according to one embodiment of the invention.

FIG. 18 depicts a Reimbursement Detail Screen according to one embodiment of the invention.

FIG. 19 depicts a Transportation Account History Screen according to one embodiment of the invention.

DETAILED DESCRIPTION OF THE INVENTION

Figure 1:
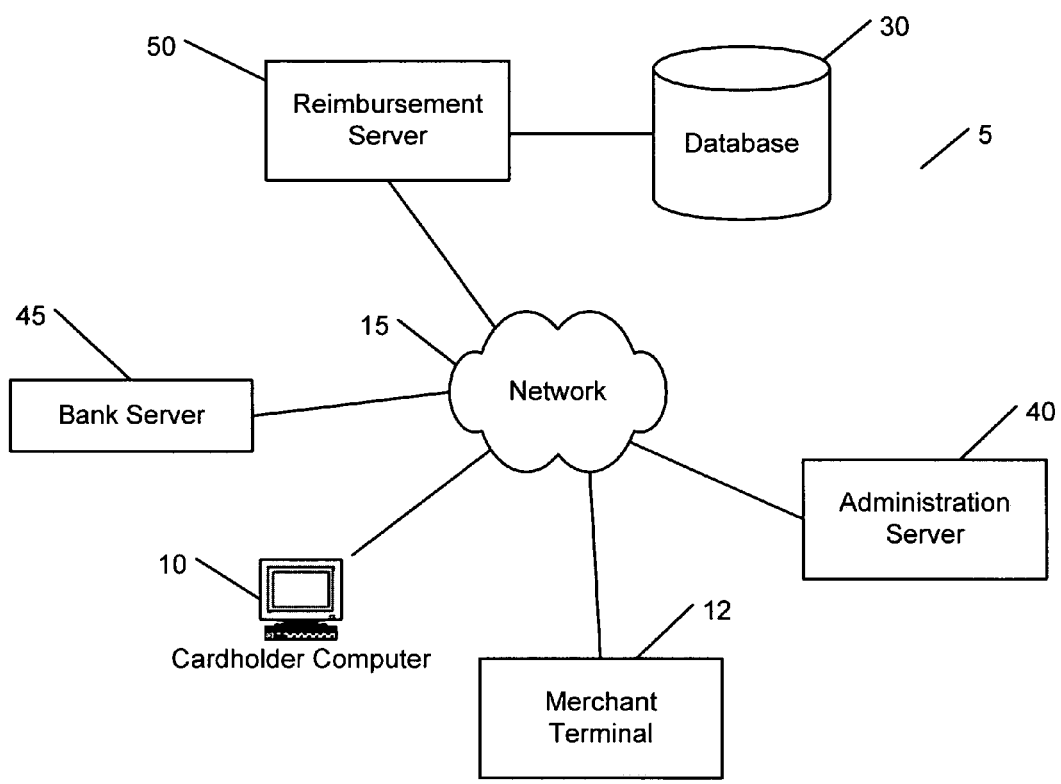
FIG. 1 is a block diagram of a Payment and Reimbursement System according to one embodiment of the present invention.

The present invention now will be described more fully with reference to the accompanying drawings, in which some, but not all embodiments of the invention are shown. Indeed, this invention may be embodied in many different forms and should not be construed as limited to the embodiments set forth herein. Rather, these embodiments are provided so that this disclosure will satisfy applicable legal requirements. Like numbers refer to like elements throughout.

As will be appreciated by one skilled in the art, various embodiments of the present invention may be, for example, a method, a data processing system, a financial payment card (such as a credit card, a debit card, or a pre-paid card), or a computer program product. Accordingly, the present invention may take the form of an entirely hardware embodiment, an entirely software embodiment, or an embodiment combining software and hardware aspects. The invention may also take the form of a unique credit card or a related method of doing business. Furthermore, the present invention may take the form of a computer program product on a computer-readable storage medium having computer-readable program instructions (e.g., computer software) embodied in the storage medium. More particularly, the present invention may take the form of web-implemented computer software. Any suitable computer-readable storage medium may be utilized including hard disks, CD-ROMs, optical storage devices, or magnetic storage devices.

The present invention is described below with reference to block diagrams and flowchart illustrations of methods, apparatuses (i.e., systems) and computer program products according to various embodiments of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions that execute on the computer or other programmable data processing apparatus create a system for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Brief Overview

A reimbursement system according to one embodiment of the invention includes a transaction processing system that automatically submits and processes reimbursement requests for particular types of charges made on a particular credit card. For example, in one embodiment of the invention, a cardholder may use their credit card to pay certain reimbursable charges related to health care, travel, entertainment, dependent care, parking, or transit use. The transaction processing system then automatically identifies the charges as reimbursable, automatically substantiates the charges, and arranges for reimbursement from one or more appropriate responsible payment sources. In one embodiment of the invention, once a particular charge has been substantiated, the system deducts the amount of the charge from an appropriate payment account (e.g., a flexible spending, dependent care account, parking account, or travel account) and then reimburses the charge directly to an account associated with the credit card used to make the charge. This can eliminate the need for the user to submit reimbursement requests for particular reimbursable charges.

In a particular embodiment, the credit card may also be used to pay for non-reimbursable charges and for reimbursable charges that do not qualify for automatic substantiation. In one embodiment, non-reimbursable charges are treated as standard credit card charges for which the cardholder is responsible. In a particular embodiment, for reimbursable charges that do not qualify for auto-substantiation based on information obtained from the transaction, the user may submit additional substantiation materials (e.g., via an appropriate paper or electronic submission) for processing by the system. In a particular embodiment, once the substantiation materials are used to properly substantiate the transaction, the amount of the related charge is then reimbursed directly to the customer's credit card. Alternatively, at least part of the charge (and in some embodiments, all of the charge) is reimbursed directly to the individual.

Also, in various embodiments, the system is configured to allow users to manually associate particular charges with a particular payment source. Users may do this, for example, via an appropriate web site. In one embodiment, once a user (e.g., a cardholder) associates a particular charge with a particular payment source, the system processes the payment as if the system had automatically identified the charge as being potentially reimbursable from the payment source indicated by the user.

The structure and operation of the system will now be described in greater detail.

Structure of Exemplary System

A system 5 according to one embodiment of the invention is shown in FIG. 1. As may be understood from this figure, in this embodiment, the system 5 includes at least one cardholder computer 10 that is connected (e.g., via a network 15 such as a LAN or a global communications network, such as the Internet) to communicate with a Reimbursement Server 50. In one embodiment of the invention, the Reimbursement Server 50 is configured for retrieving data from, and for saving data to, a database 30 that may be stored on (or, alternatively, stored remotely from) the Reimbursement Server 50. In the embodiment shown in FIG. 1, the database 30 is maintained on a computer that is remote from the Reimbursement Server 50.

Figure 2:
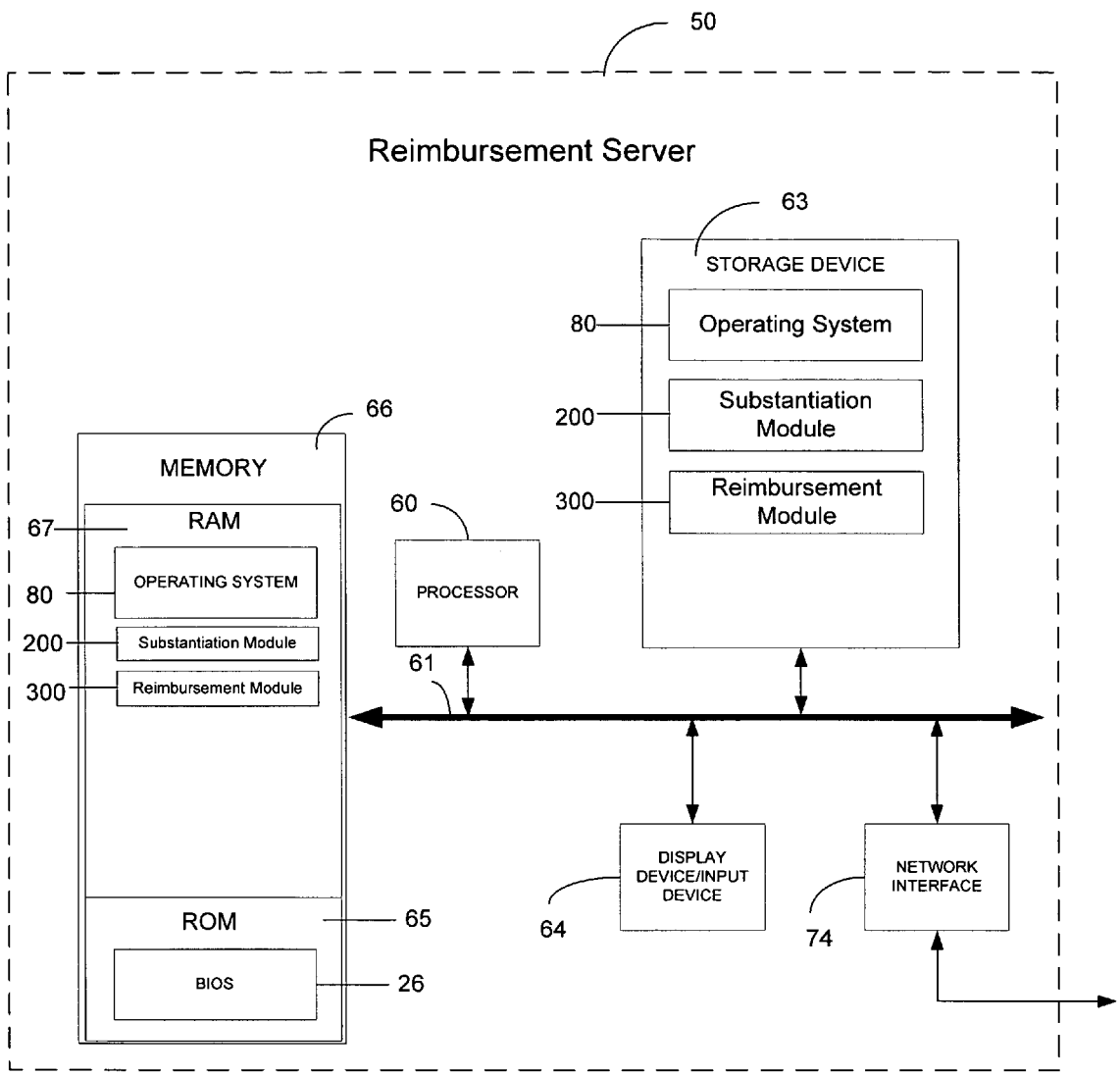
FIG. 2 is a diagram of a Reimbursement Server according to one embodiment of the present invention.

FIG. 2 shows a schematic diagram of a reimbursement server 50 according to one embodiment of the invention. As may be understood from this figure, in this embodiment, the reimbursement server 50 includes a processor 60 that communicates with other elements within the reimbursement server 50 via a system interface or bus 61. Also included in the reimbursement server 50 is a display device/input device 64 for receiving and displaying data. This display device/input device 64 may be, for example, a keyboard or pointing device that is used in combination with a monitor. The reimbursement server 50 further includes memory 66, which preferably includes both read only memory (ROM) 65 and random access memory (RAM) 67. The server's ROM 65 is used to store a basic input/output system 26 (BIOS), containing the basic routines that help to transfer information between elements within the reimbursement server 50.

In addition, the reimbursement server 50 includes at least one storage device 63, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 63 is connected to the system bus 61 by an appropriate interface. The storage devices 63 and their associated computer-readable media provide nonvolatile storage for a personal computer. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices and within RAM 67. Such program modules include an operating system 80, a substantiation module 200 and a reimbursement module 300. As described in more detail below, the substantiation module 200 and the reimbursement module 300 control certain aspects of the operation of the reimbursement server 50, with the assistance of the processor 60 and an operating system 80.

Also located within the reimbursement server 50 is a network interface 74, for interfacing and communicating with other elements of a computer network. It will be appreciated by one of ordinary skill in the art that one or more of the reimbursement server 50 components may be located geographically remotely from other reimbursement server 50 components. Furthermore, one or more of the components may be combined, and additional components performing functions described herein may be included in the reimbursement server 50.

Operation of an Exemplary System

Figure 3:
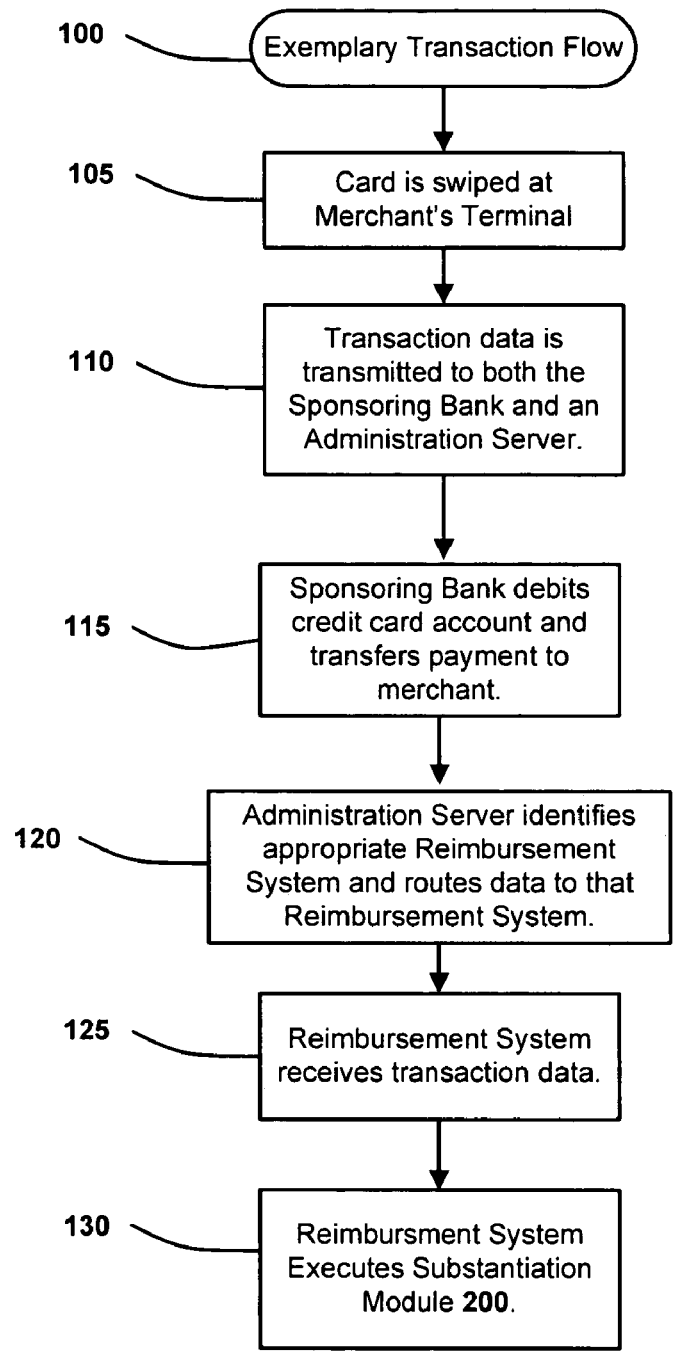
FIG. 3 is a flowchart that illustrates various steps executed within an Exemplary Transaction Flow according to a particular embodiment of the invention.

FIG. 3 illustrates an embodiment of an exemplary transaction flow 100 associated with the reimbursement and payment system. Beginning at Step 105, a cardholder uses a credit card to make a purchase at a merchant, and the merchant charges the purchase to a credit card by swiping the credit card through a standard credit card machine. Next, at Step 110, the credit card machine transmits data related to the transaction ("transaction data") to a server associated with a card processor (such as Fiserv), which routes the transaction data to both an administration sever 40 and to a bank server 45 associated with the bank that sponsors the credit card (the "issuing bank"). In one embodiment of the invention, the transaction data includes, for example, a merchant category code associated with the merchant, the amount of the purchase, and a merchant identification code associated with the merchant. In various embodiments of the invention, the transaction data includes one or more of the following type of information: (1) merchant category code; (2) purchase amount; (3) purchase data; (4) point of sale device number; (5) merchant description; (6) cardholder account number; (7) cardholder card number. In various embodiments of the invention, the transaction data may include, for example, one or more of the following types of information: (1) merchant category code; (2) purchase amount; (3) purchase data; (4) point of sale device number; (5) merchant description; (6) cardholder account number; and (7) cardholder card number. In other embodiments, for air travel related transactions, the transaction data may include, for example, one or more of the following types of information: (1) ticket number; (2) passenger name; (3) city of origin; (4) city of destination; (5) service class; (6) arrival date; (7) departure date; (8) carrier; (9) stop over; and (10) return city. In further embodiments of the invention, for car rental transactions, the transaction data may include: (1) renter name; (2) check out data; (3) agreement number; (4) return date; (5) return state; (6) arrival date; and (7) departure date. In various embodiments of the invention, any one or more of the above may be used as criteria to determine whether a particular transaction may be auto-substantiated.

Next, at Step 115, the issuing bank debits the credit card account by the amount of the purchase and transfers appropriate payment to the merchant for the purchase. At Step 120, the Administration Server 40 then identifies a reimbursement system associated with the credit card and routes the transaction data to the identified reimbursement system. Next, at Steps 125 and 130, the Reimbursement System receives the transaction data and executes the Substantiation Module 200.

In one embodiment of the invention, the Administration server 40 delays performing this step until a specified time, when it routes the transaction data to the transaction routing server as part of a data stream containing a larger set of transaction data to be processed by the identified reimbursement system.

Figure 4:
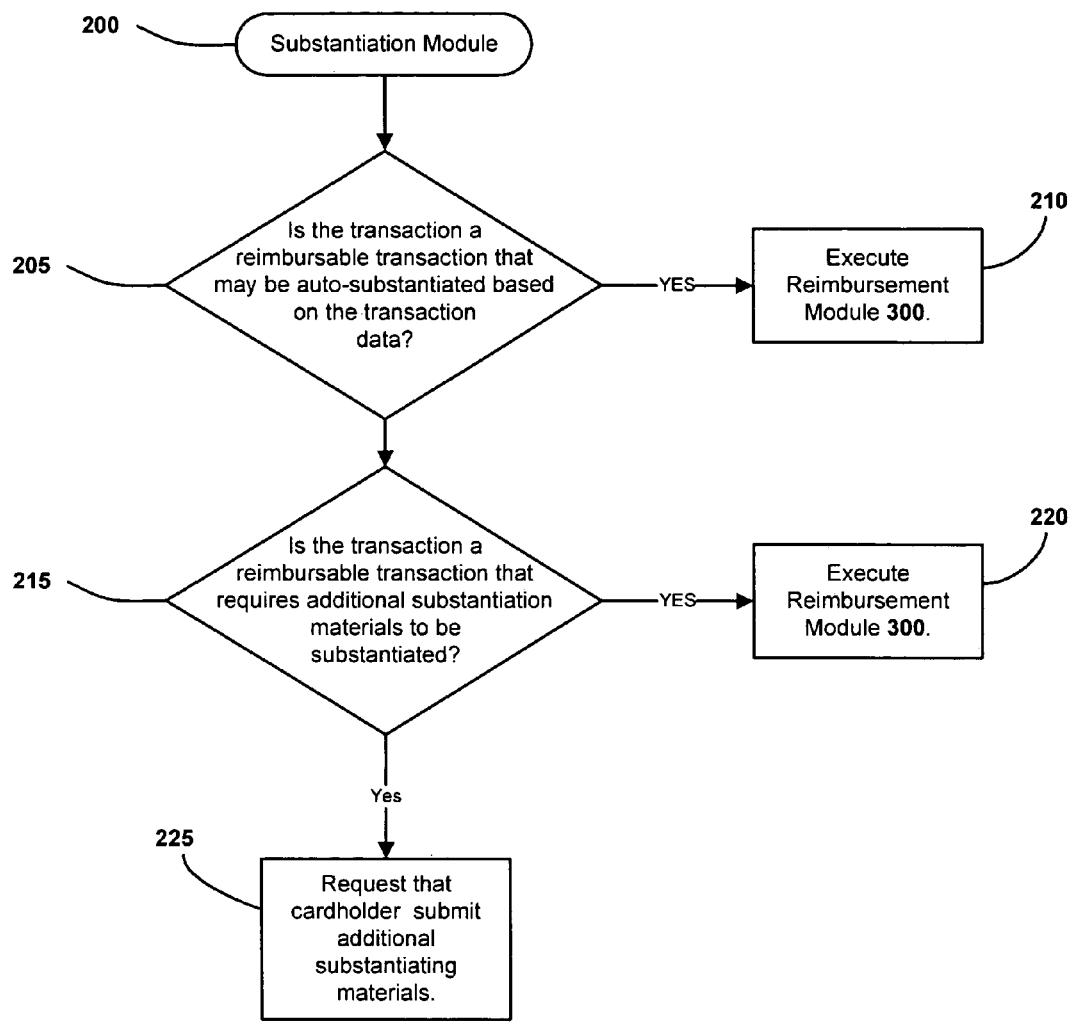
FIG. 4 is a flowchart that illustrates various steps executed within a Substantiation Module according to a particular embodiment of the invention.

Turning to FIG. 4, when the reimbursement system executes the Substantiation module 200, it begins at Step 205, where it analyzes the transaction data to determine whether the transaction is a reimbursable transaction that may be automatically (or substantially automatically) substantiated based on the transaction data. In one embodiment of the invention, the reimbursement system does this by determining whether the transaction data satisfies one or more predefined sets of auto-substantiation criteria. One such set of auto-substantiation criteria may be, for example, that the merchant category code and/or other transaction data associated with the transaction indicates that the charge was made for a travel-related purchase (e.g., a plane ticket), and that the amount of the charge is less than a pre-determined amount (e.g., $300). Another such set of auto-substantiation criteria may be, for example, that the merchant category code corresponds to a health care provider. The various sets of auto-substantiation criteria may be established, for example, by the employer or by the administrator of an account, such as the administer of a flexible spending account.

Figure 5:
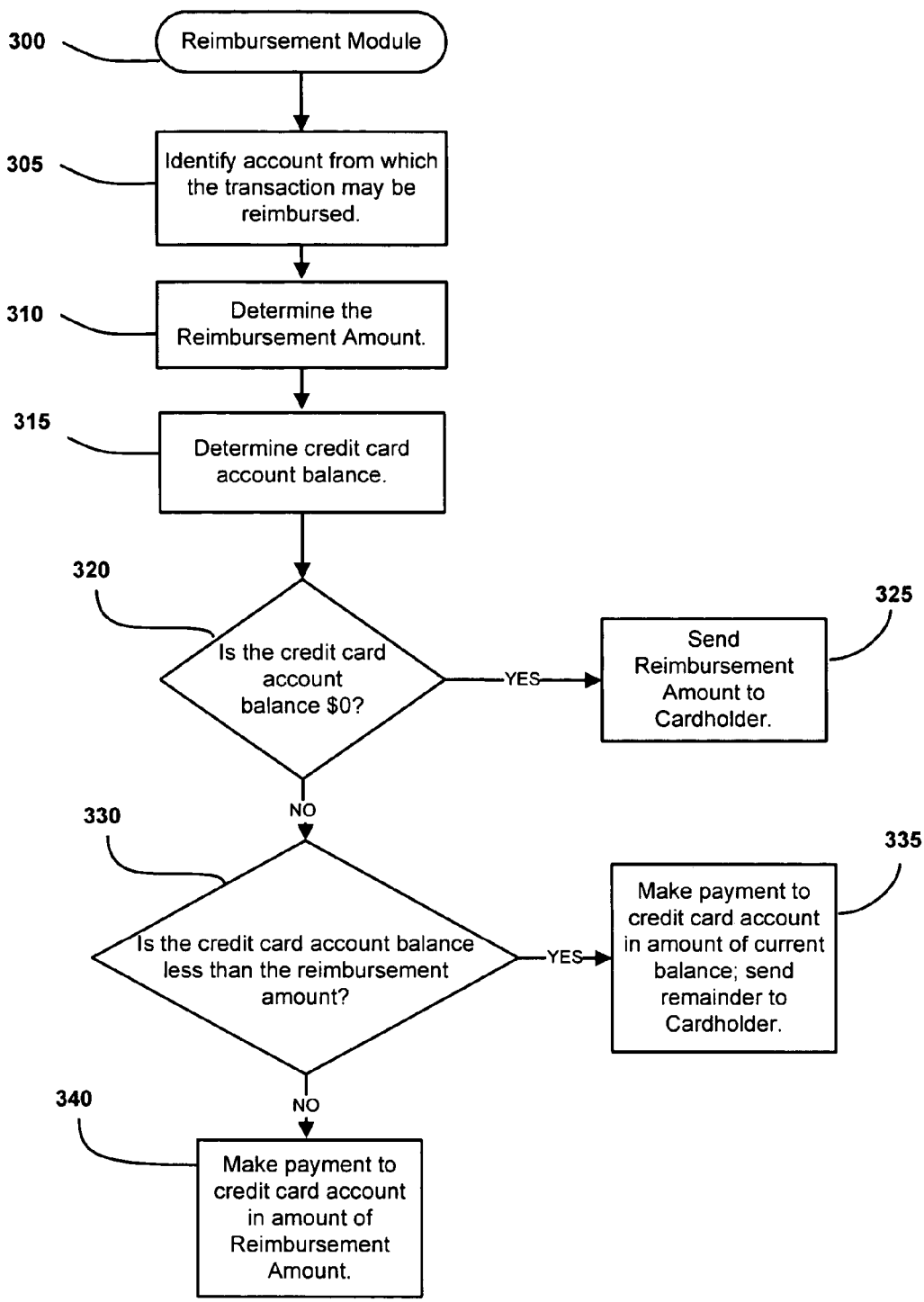
FIG. 5 is a flowchart that illustrates various steps executed by a Reimbursement Module according to a particular embodiment of the invention.

If the system determines, at Step 205, that the transaction qualifies for auto-substantiation (e.g., if the transaction data for the transaction satisfies one or more of the sets of auto-substantiation criteria), the system advances to Step 210, where it executes a reimbursement module, such as the reimbursement module 300 depicted in FIG. 5.

As may be understood from FIG. 5, in one embodiment of the invention, when the reimbursement system executes the reimbursement module 300, the system first proceeds to Step 305, where it identifies an account from which the transaction may be reimbursed. The reimbursement system may do this, for example, by accessing this information from an database record associated with the cardholder's account.

Next, at Step 310, the system determines the amount to be reimbursed (the "Reimbursable Amount") from the account at issue. In one embodiment of the invention, the system makes this determination based on one or more of the following factors: (1) the amount of money left in the particular account; and (2) the rules established for payment of transactions out of the account. For example, if the transaction amount is $300, and only $200 remain in the applicable account, in one embodiment of the invention, the reimbursement amount will be $200 (the amount remaining in the account). Similarly, if the transaction amount is $300, but the rules associated with the account specify that the maximum payment for the type of transaction at issue (e.g., an airplane ticket) is $250, the reimbursement amount will be $250 (the maximum amount payable for the transaction).

After the system determines the appropriate reimbursement amount, the reimbursement system proceeds to step 315 where it determines the balance on the cardholder's credit card account (e.g., by requesting this information from the appropriate Sponsor Bank). Next, the system proceeds to Step 320 where it determines whether there is a zero balance on the cardholder's credit card account. If so, the system proceeds to Step 325, where it sends the reimbursement amount to the cardholder. The system may do this, for example, via a paper check or an electronic transfer of funds into a specified account.

If the system determines, at Step 320, that there is not a zero balance on the cardholder's credit card account, the system advances to Step 330 where it determines whether the balance on the cardholder's credit card account is less than the reimbursement amount. If so, the system advances to Step 335, where it: (1) makes a payment to the cardholder's credit card account equal to the current balance of the account (e.g., via an electronic transfer of funds, or by paper check); and (2) sends the remaining balance of the reimbursement amount to the cardholder. As noted above, the system may do this, for example, via a paper check or an electronic transfer of funds into a specified account.

If the system determines, at Step 330, that the cardholder's credit card account balance is not less than the reimbursement amount, the system proceeds to step 340, where it makes a payment to the cardholder's credit card account for the entire reimbursement amount.

In one embodiment of the invention, the system is configured to reimburse a single particular transaction from two or more accounts. For example, to determine which account should be used to reimburse a particular charge, the system access data (e.g., data stored in a database) indicating which of two particular accounts is the preferred account from which payments of a particular type are to be made. In this case, payments would first be made to the extent allowable and available from the preferred account (e.g., based on the preferred account's balance, and the rules associated with the preferred account). However, any remaining balance on the transaction would be made from the second account to the extent possible based upon the balance left in the second account and the payment rules associated with the second account. In one embodiment of the invention, such payments for each account would generally be made in the manner discussed above in regard to Steps 315-340 of FIG. 5.

For example, the system may be set up to pay certain transactions that are eligible for reimbursement from both a health care flexible spending account (FSA) and a health reimbursement arrangement (HRA) so that: (1) the transactions are reimbursed to the greatest extent possible from the FSA account; and (2) any remaining transaction balance is reimbursed, to the extent allowable, from the HRA account. As discussed above, the cardholder would be responsible for paying any amount not reimbursed by the reimbursement system.

Returning to FIG. 4, if the system determines, at Step 205, that the transaction is not a reimbursable transaction that may be auto-substantiated based on the transaction data, the system advances to Step 215 where it determines whether the transaction is a reimbursable transaction that requires additional substantiation materials (e.g., receipts or copies Explanation of Benefits forms) in order to be substantiated. If not, the system concludes that the transaction is reimbursable and proceeds to Step 220, where it stops processing the transaction. If so, the reimbursement system advances to Step 225 where it notifies the cardholder that additional substantiating materials are needed to substantiate the transaction, and requests that the cardholder submit the necessary substantiating materials. The system may notify the cardholder in one or more of a variety of different ways. For example, the cardholder may be notified via a message posted on a web site associated with the customer's credit card account, or via an e-mail message, an automated phone call, a letter, or a printed message on the customer's next credit card statement.

The cardholder may then submit the additional substantiation documentation in response to being notified that additional substantiation materials are required. In one embodiment of the invention, the cardholder may do this electronically. For example, in one embodiment, the cardholder may access a web site displaying their credit card account information and read a message indicating that the system needs a copy of a recent Explanation of Benefits form (EOB) in order to substantiate a recent health care related charge for reimbursement from the cardholder's flexible spending account. The cardholder may then submit the appropriate EOB for processing (e.g., either by sending a paper copy of the EOB to an appropriate plan administrator, or by arranging for the electronic submission of the EOB to the system.) In one embodiment of the invention, a web site associated with the credit card account is configured to allow users to view copies of their recent EOB forms and to electronically transmit those forms to the system for processing. In a particular embodiment, because the EOB is submitted electronically, the system may receive the EOB, and then use the EOB to substantiate the transaction substantially without human intervention. (Similar techniques may be used to allow users to view and process electronic transaction feed information from a Pharmacy Benefits Manager, a TPA, or an Insurance Carrier).

Detailed Discussion of Exemplary Embodiment

Figure 6:
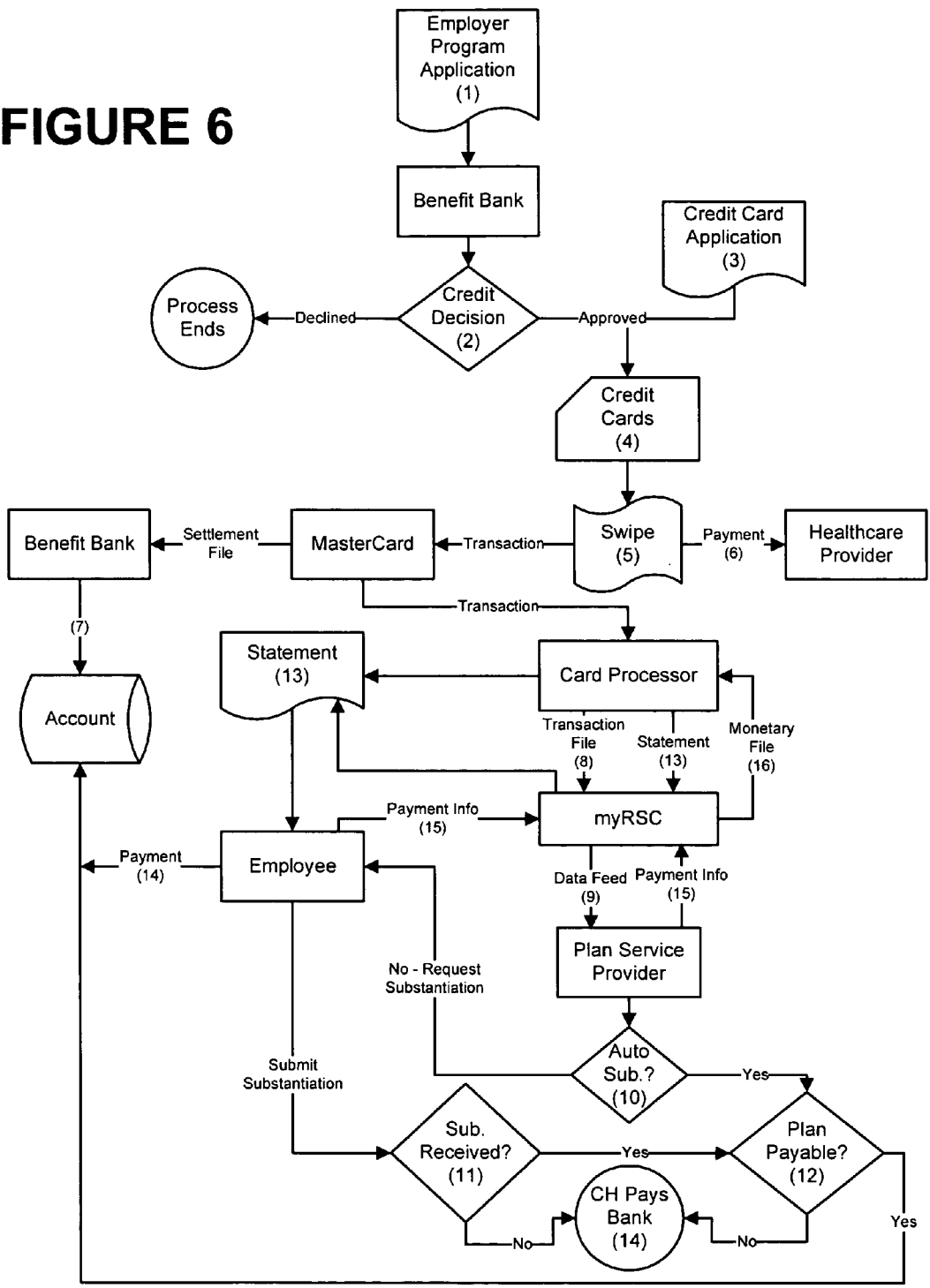
FIG. 6 is a flowchart that illustrates transaction flow within a Payment and Reimbursement system according to a particular embodiment of the invention.

A more specific embodiment of the invention, which is shown in FIG. 6, will now be discussed. Steps 1-16 below should be read in conjunction with this figure, which graphically depicts the various steps executed within a system according to a particular embodiment of the invention. As may be understood from this figure, at Step (1), the Employer submits a myResourceCard™ program application that includes the financial information necessary for the bank to make a credit decision. At Step (2), the bank approves or denies credit based on the overall package and informs the Employer. Approval is based on the Employer's credit worthiness. The Employer line of credit facilitates guaranteed issue of individual consumer credit cards to employees preselected by the Employer. Accordingly, in this embodiment, the employer acts as guarantor for one or more credit cards, such as the card referenced above, that are issued to one or more of the employer's employees.

At Step (3), if the Employer line of credit is approved, the Employer-designated employees complete individual applications for credit cards and submit the applications for card issuance. Next, at Step (4), credit cards are then issued by the bank to participating employees. At Step (5), an employee then uses their issued credit card at a qualified merchant (e.g., a health care provider). In one embodiment, use of the credit card for non-qualified expenses and at non-qualified merchants is permitted, but such charges are ineligible for automatic reimbursement from an Employer plan (such as a health care account, a travel expense account, or a parking account), and must be paid off by the employee pursuant to the applicable employee cardholder agreement (or by the Employer upon default by the employee).

At Step (6), the Healthcare Provider (or other merchant) receives payment from the bank. Next, at Step (7), as a result of the transaction, the Employee is obligated to the bank as recorded in the credit card cardholder agreement. In one embodiment, the set of agreements is a trilateral arrangement between the Employer, the employee, and the bank. In a particular embodiment of the invention, according to the cardholder agreement's default process, if the employee defaults, then the Employer guarantee will be used to pay off the credit card balance. In one embodiment, default is defined under the terms of the cardholder agreement as a failure to pay off the non-qualified balance (either by payment or submission of adequate substantiation resulting in payment from an appropriate Plan) within a specified number of billing cycles.

At Step (8), a card processor (such as Fiserv) separately creates a daily file containing information about transactions and sends this daily file to a central computer (e.g., a server associated with myRSC.com, which in one embodiment, is an example of an administration server). Next, At Step (9), the central computer then aggregates all the transactions by the Employer and makes them available to the Employer's Plan Service Provider (PSP) (e.g., as a data feed) to become possible claims against the employees' reimbursement plans (e.g., health care accounts, travel expense accounts, parking accounts, and/or child care accounts).

At Step (10) transaction data is compared to the plan parameters of the employee's elected plans. Based on IRS Guidance (such as Rev. Ruling 2003-43 and similar rulings) the reimbursement administration system determines whether the transaction is a claim that needs further substantiation. In many cases, the transaction can be substantiated by comparing the post authorization transaction's data to the reimbursement plan's automatic substantiation parameters. These transactions need no further paper substantiation, increasing efficiency and convenience to the employee.

As an aside, in various embodiments of the invention, the various automatic substantiation parameters may be defined, for example, by one or more of the following parties: (1) the employer; (2) the relevant TPA; or (3) the employee. In addition, these parameters may be defined to apply to: (1) all employers for which plans are administered by the TPA; (2) all employees of a particular employer; and/or (3) individual employees. In cases where the parameters are defined to apply to all employees for a particular employee, in one embodiment, the system is configured for allowing exceptions to be made to the general rule. Accordingly, different "customized" parameters could defined to apply to selected employees.

Similarly, in cases where the parameters are defined to apply to all employers for a particular TPA, in one embodiment, the system is configured for allowing exceptions to be made to the general rule. Accordingly, different "customized" parameters could defined to apply to selected employers.

At Step (11), if the transaction needs further substantiation, the employee is notified (e.g., by electronic means) and an opportunity to submit additional substantiation to the Plan Service Provider is provided (e.g., via a graphical user interface). Where adequate supporting substantiation is provided, reimbursements can be made directly to the employee's credit card account. This results in both an increased operational efficiency to the program and convenience to the employee.

At Step (12), upon adjudication against the employee's reimbursement plan, the reimbursable amount of the transaction is determined. If the employee has an outstanding card balance with the bank, then the reimbursement is directed to the employee credit card account. Otherwise, reimbursement is made to the employee.

At Step (13), the card processor sends a statement file to the central computer (e.g., myRSC.com), and the central computer (e.g., myRSC.com) then sends a statement to the employee.

At Step (14), the employee (a referred to in this figure as "CH", or cardholder) reviews the statement and makes payment (if there is a remaining balance). In one embodiment of the invention, for any charges that are not reimbursed by an appropriate reimbursement account, the employee may have a second opportunity to provide adequate substantiation to the Plan Service Provider to relieve the balance via a reimbursement from an appropriate reimbursement account. Alternatively, the employee may have until the expiration of a pre-determined number of billing cycles, or until an event of "default" occurs, to pay off the non-qualified balance. If a default event occurs, the Employer may, pursuant to the applicable cardholder agreement, withhold money from the employee's future paychecks until the employee's balance is paid off, or may engage in other collection activities as allowed under applicable law.

Next, at Step (15), payment information is sent to the central computer (e.g., the myRSC.com web server). Finally, at Step (16), the central computer sends a monetary file to the card processor to update the account balances.

Graphical User Interface

Figure 10:
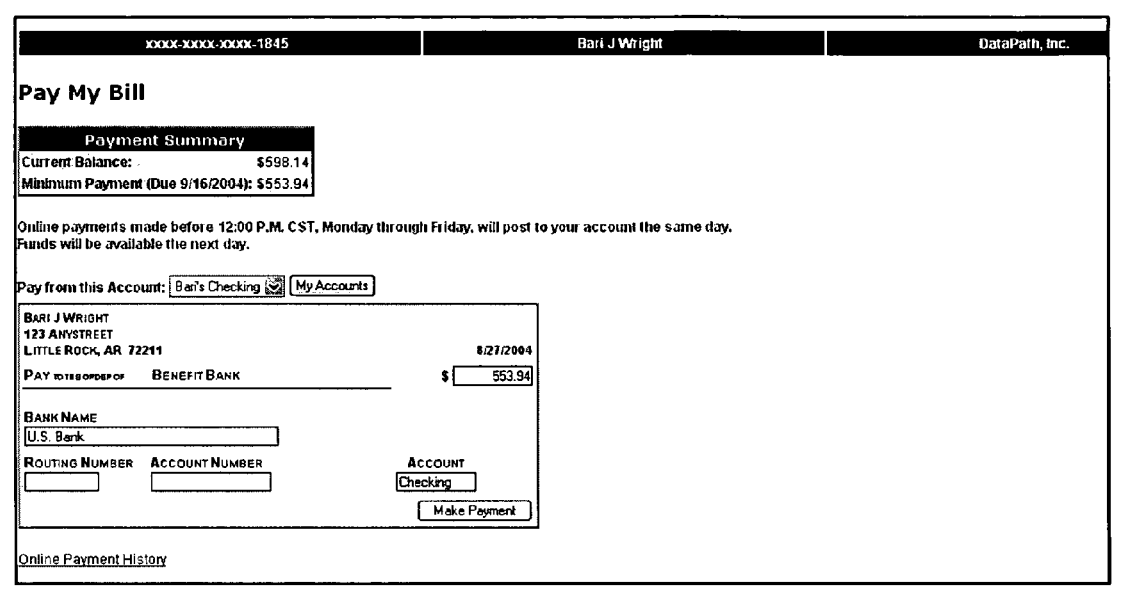

As noted above, in one embodiment of the invention, the reimbursement and payment system includes a graphical user interface that allows the employee, employer, and plan administrator to access the system. In a particular embodiment, the employee can use this interface to: (1) view their various account balances (e.g., the account balances on their various health care accounts, entertainment accounts, parking accounts, travel accounts, and dependent care accounts); (2) view recent Explanation of Benefits (EOB) summaries; (3) submit additional substantiation information for a transaction; (4) recategorize transactions marked as "non-reimbursable" as "reimbursable"; or (5) change the pre-assigned account for a particular transaction to an alternate account; and (6) allocate portions of a transaction to two or more reimbursable accounts. In one embodiment, at least one of the accounts is funded, at least in part, by the employer. The interface, according to one embodiment, may further allow the employee to make online payments to the credit card account. (See FIG. 10).

In a particular embodiment, the plan administrator or the employer can use the interface to view employee account balances, summaries, and pending transactions. The interface also provides the employer or plan administrator with a search engine to search for account records, such records regarding accounts with overdue balances or transactions made to certain merchants or health care providers. (See FIG. 8). In a particular embodiment, the interface allows the employer or plan administrator to set up and alter plan parameters used by the reimbursement system in processing transactions.

Figure 9:
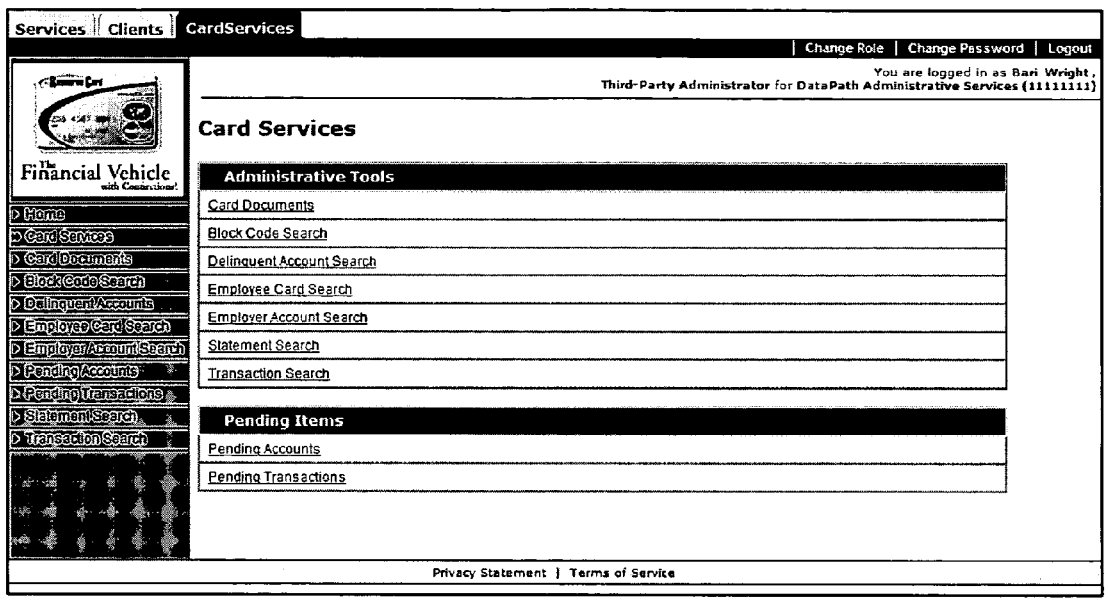
FIG. 9 depicts a Card Services Screen according to one embodiment of the invention.

For example, as depicted in FIGS. 7 and 8, the plan administrator or the employer can use the graphical user interface to view employee account information such as account balances, summaries, and pending transactions. In addition, as shown in FIG. 8, the interface may provide the employer or plan administrator with a search engine to search for account records, such as accounts with overdue balances, or transactions to certain merchants or health care providers. FIG. 9 is an exemplary system administrative menu.

One particular embodiment includes an interface that allows employees to view their card account balances (See FIG. 11) and Explanation of Benefits (EOB) summaries. Similarly, a particular embodiment of the invention allows employees to submit additional substantiation information for a transaction (such as electronic EOB's) in electronic format.

FIG. 12 shows an embodiment of an interface that displays the various posted transactions associated with a cardholder's account. As may be understood from this figure, these posted transactions may include charges, payments by the cardholder, and reimbursements for claims that were automatically substantiated by the system. For example, this figure reflects a completed claim reimbursement of $20.83.

As mentioned above, one embodiment of the invention includes an interface that allows the employee to: (1) recategorize transactions marked as "non-reimbursable" as "reimbursable" transactions; (2) change the pre-assigned account for a particular transaction to an alternate account; or (3) allocate portions of a particular transaction two or more different reimbursable accounts. For example, if the reimbursement system associates a first payment source with a particular transaction according to the specified plan parameters, the employee, through the graphical user interface, can reassociate the transaction with a second payment source or reclassify the transaction as "personal" or non-reimbursable. If the transaction is associated with a second payment source, the transaction data is rerouted through the reimbursement system to determine if the transaction meets the plan parameters for the second payment source. If the parameters are satisfied, the reimbursement amount is deducted from the second account. If the employee designates the transaction as personal or non-reimbursable, the system does not reimburse the employee for the transaction.

In another embodiment, the graphical user interface allows the employee to allocate portions of a transaction amount to one or more billing numbers or accounts associated with the payment source from which the transaction amount has been, or will be, reimbursed. For example, in one embodiment of the invention, the system's graphical user interface allows the employee to associate portions of particular transactions with one or more internal billing numbers. This association does not affect the responsibility of the employer (or other payment source) to reimburse the employee for the transaction, but allows the employee to assist the employer in accounting for the expense associated with the transaction internally. For example, if an employee travels to conduct business on behalf of a two or more different clients, the employee can use the interface to indicate that the related travel expenses should be split equally between the clients, which allows the employer to bill the clients appropriately for the travel expenses.

Figure 13:
FIG. 13 depicts a Main Menu Screen according to one embodiment of the invention.
Figure 14:
FIG. 14 depicts an EOB Summary Screen according to one embodiment of the invention.

FIGS. 13-19 are exemplary screens within a graphical user interface according to a particular embodiment of the invention. FIG. 13 is a main menu screen from which the user may transition to various other screens, such as the EOB Summaries Screen shown in FIG. 14, and the account history screen shown in FIG. 15.

Figure 15:
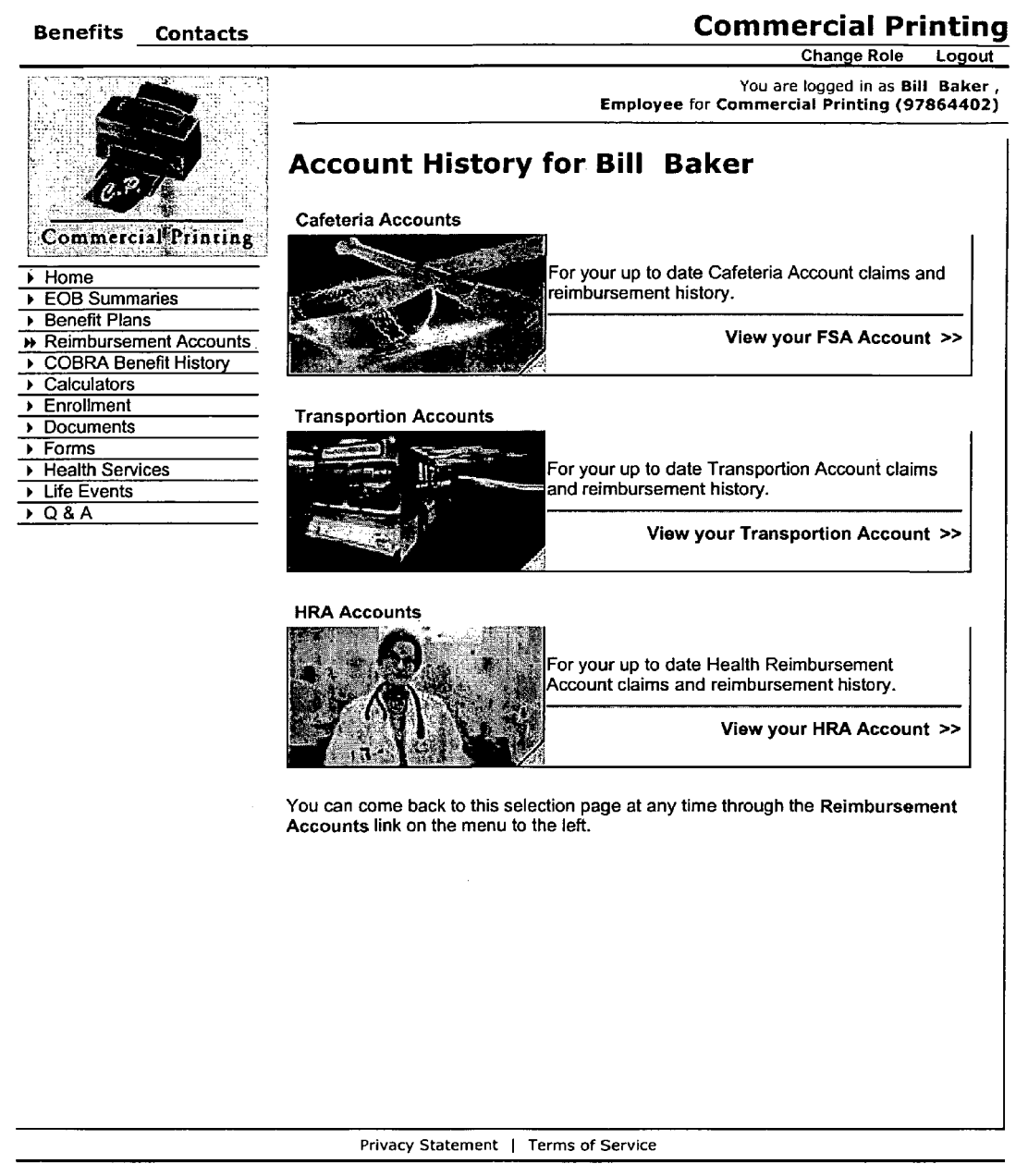

The account history screen shown in FIG. 15 shown a summary of the user's various recent EOB's. In one embodiment, the screen is configured to allow the user to view an electronic version of the relevant EOB by selecting, for example, the claim number that corresponds to the EOB.

Furthermore, in a particular embodiment of the invention, the system is configured to display information indicating which of one or more accounts were used to pay the portion of a particular claim for which the patient was responsible. For example, in the example shown in FIG. 14, if the user wished to see how the $46.72 "patient responsibility" amount was paid for claim 81, the patient could simply click on the "$46.72" hyperlink shown in FIG. 14. The patient would then be shown which accounts were used to pay this amount, along with the amount paid from each account. For example, if the entire amount was paid from the user's FSA account, this would be displayed to the user.

Conclusion

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended exemplary concepts. Although specific terms are employed herein, they are used in a generic and descriptive sense only and not for the purposes of limitation.

We claim:

1. A credit card transaction processing system comprising:
at least one computer processor; and
a memory coupled to said computer processor, said credit card transaction processing system is configured for:
receiving transaction data related to a reimbursable charge made on said credit card by a credit card holder, said credit card issued by a third party bank;
analyzing said transaction data to determine whether said charge may be auto-substantiated;
in response to determining that said charge may be auto-substantiated, auto-substantiating said charge; and
in response to said charge being auto-substantiated, reimbursing said credit card holder for at least a portion of said charge at least substantially without human intervention.

2. The credit card transaction processing system of claim 1, wherein said step of reimbursing said credit card holder for at least a portion of said charge comprises making a payment to an account associated with said credit card.

3. The credit card processing system of claim 1, wherein said step of reimbursing said credit card holder for at least a portion of said charge comprises making a payment directly to said credit card holder.

4. The credit card processing system of claim 1, wherein said step of reimbursing said credit card holder for at least a portion of said charge comprises:
(A) making a first payment to an account associated with said credit card; and
(B) making a second payment directly to said credit card holder.

5. The credit card processing system of claim 1, wherein said step of analyzing said data comprises comparing transaction data associated with said charge with one or more sets of auto-substantiation criteria.

6. The credit card processing system of claim 5, wherein said system is further configured for, in response to determining that said transaction data associated with said charge satisfies at least one of said one or more sets of pre-determined auto-substantiation criteria, determining that said charge may be auto-substantiated.

7. The credit card processing system of claim 6, wherein said system is further configured for allowing a user to define said pre-determined auto-substantiation criteria on a customized basis for said credit card holder.

8. The credit card processing system of claim 6, wherein said system is configured for:
in response to determining that said transaction data associated with said charge satisfies one or more Flexible Spending Account parameters, determining that said charge may be auto-substantiated; and
in response to determining that said transaction data associated with said charge satisfies one or more Health Reimbursement Arrangement parameters, determining that said charge may be auto-substantiated.

9. The credit card processing system of claim 8, wherein said system is configured for:

in response to determining that said transaction data associated with said charge satisfies one or more Health Saving Account parameters, determining that said charge may be auto-substantiated.

10. The credit card processing system of claim 6, wherein said system is configured for:
in response to determining that said transaction data associated with said charge satisfies one or more Flexible Spending Account parameters, determining that said charge may be auto-substantiated; and
in response to determining that said transaction data associated with said charge satisfies one or more expense account parameters, determining that said charge may be auto-substantiated.

11. The credit card processing system of claim 10, wherein said expense account is a travel expense account.

12. The credit card processing system of claim 6, wherein said step of determining that said transaction data associated with said charge satisfies at least one of said one or more sets of pre-determined auto-substantiation criteria comprises determining that said transaction data satisfies one or more Flexible Spending Account parameters.

13. The credit card processing system of claim 6, wherein said step of determining that said transaction data associated with said charge satisfies at least one of said one or more sets of pre-determined auto-substantiation criteria comprises determining that said transaction data satisfies one or more Heath Saving Account parameters.

14. The credit card processing system of claim 6, wherein said step of determining that said transaction data associated with said charge satisfies at least one of said one or more sets of pre-determined auto-substantiation criteria comprises determining that said transaction data satisfies one or more Health Reimbursement Arrangement parameters.

15. The credit card processing system of claim 6, wherein said step of determining that said transaction data associated with said charge satisfies at least one of said one or more sets of pre-determined auto-substantiation criteria comprises determining that a merchant category code associated with said charge is a health care related merchant category code.

16. The credit card processing system of claim 6, wherein said step of determining that said transaction data associated with said charge satisfies at least one of said one or more sets of pre-determined auto-substantiation criteria comprises determining that a merchant category code associated with said charge is a dependent care related merchant category code.

17. The credit card processing system of claim 6, wherein said step of determining that said transaction data associated with said charge satisfies at least one of said one or more sets of pre-determined auto-substantiation criteria comprises determining that a merchant category code associated with said charge is a parking related merchant category code.

18. The credit card processing system of claim 6, wherein said step of determining that said transaction data associated with said charge satisfies at least one of said one or more sets of pre-determined auto-substantiation criteria comprises determining that a merchant category code associated with said charge is a mass transit related merchant category code.

19. The credit card processing system of claim 6, wherein said step of determining that said transaction data associated with said charge satisfies at least one of said one or more sets of pre-determined auto-substantiation criteria comprises determining that a merchant category code associated with said charge is an entertainment related merchant category code.

20. The credit card processing system of claim 6, wherein said step of determining that said transaction data associated with said charge satisfies at least one of said one or more sets of pre-determined auto-substantiation criteria comprises determining that a merchant category code associated with said charge is an business-expense related merchant category code.

21. The credit card processing system of claim 6, wherein said step of determining that said transaction data associated with said charge satisfies at least one of said one or more sets of pre-determined auto-substantiation criteria comprises determining that a merchant category code associated with said charge is a travel related merchant category code.

22. The credit card processing system of claim 1, wherein said transaction data comprises a merchant category code.

23. The credit card processing system of claim 1, wherein said transaction data comprises a charge amount.

24. The credit card processing system of claim 1, wherein said transaction data comprises information regarding an item or service purchased as part of said transaction.

25. The credit card processing system of claim 1, wherein said system is configured for reimbursing said credit card holder from any of a plurality of reimbursement accounts associated with said credit card holder.

26. The credit card processing system of claim 1, wherein said credit card is issued to said credit card holder and said credit card holder's employer acts as a guarantor for said credit card.

27. The credit card processing system of claim 1, wherein said credit card transaction processing system is configured for, in response to determining that said charge may not be auto-substantiated, requesting additional substantiation materials from said credit card holder.

28. The credit card processing system of claim 27, wherein said credit card transaction processing system is configured for receiving substantiation-related information obtained from said substantiation materials; and using said substantiation-related information to auto-substantiate said charge.

29. The credit card transaction processing system of claim 1, wherein the credit card is issued to the credit card holder on the basis of credit worthiness of the employer.

30. The credit card transaction processing system of claim 1, wherein the credit card is issued based on the credit worthiness of the credit card holder.

31. A credit card transaction processing system that is configured for:
(A) receiving transaction information regarding a credit card transaction related to a reimbursable charge made on a credit card by a credit card holder;
(B) determining that said credit card transaction would qualify for reimbursement from a first account;
(C) determining that said credit card transaction would also qualify for reimbursement from a second account; and
(D) determining, based at least in part on said transaction information, to reimburse at least a portion of said credit card transaction from said first account.

32. The credit card transaction processing system of claim 31, wherein said credit card transaction processing system is further configured for:
(E) determining that said credit card transaction would also qualify for reimbursement from a third account.

33. The credit card transaction processing system of claim 31, wherein said system is configured for executing said Steps (A), (B), and (C) substantially without human intervention.

34. The credit card transaction processing system of claim 31, wherein said system is configured to determine whether said first account includes sufficient finds to reimburse said credit card transaction; and in response to determining that said first account does not include sufficient funds to reimburse said credit card tans action, reimbursing at least a part of said credit card transaction from said second account.

35. The credit card transaction processing system of claim 31, wherein said first account is a first health care reimbursement account, and said second account is a second health care reimbursement account.

36. The credit card transaction processing system of claim 31, wherein said first account is a flexible spending account, and said second account is a health reimbursement arrangement.

37. The credit card transaction processing system of claim 31, wherein said first account is a health reimbursement arrangement, and said second account is a flexible spending account.

38. The credit card transaction processing system of claim 31, wherein said credit card transaction processing system is configured for:
   determining to reimburse at least a portion of said credit card transaction from said first account based on an account transaction preference specified by said credit card holder in advance of said credit card transaction.

39. The credit card transaction processing system of claim 31, wherein said credit card transaction processing system is configured for:
   determining to reimburse at least a portion of said credit card transaction from said first account based on an account transaction preference specified by said credit card holder's employer in advance of said credit card transaction.

40. The credit card transaction processing system of claim 31, wherein said credit card is issued by a third party bank.

41. A credit card transaction processing system comprising:
   at least one computer processor; and
   a memory coupled to said computer processor, said credit card transaction processing system is configured for:
      receiving transaction data related to a reimbursable charge made on said credit card by a credit card holder;
      analyzing said transaction data to determine whether said charge may be auto-substantiated by comparing transaction data associated with said charge with one or more sets of auto-substantiation criteria;
      in response to determining that said transaction data associated with said charge satisfies at least one of said one or more sets of pre-determined auto-substantiation criteria, determining that said charge may be auto-substantiated;
      in response to determining that said charge may be auto-substantiated, auto-substantiating said charge; and
      in response to said charge being auto-substantiated, reimbursing said credit card holder for at least a portion of said charge at least substantially without human intervention,
   wherein the system is further configured for allowing a user to define said pre-determined auto-substantiation criteria on a customized basis for said credit card holder.

42. A credit card transaction processing system that is configured for:
   (A) receiving transaction information regarding a credit card transaction related to a reimbursable charge made on a credit card by a credit card holder;
   (B) determining that said credit card transaction would qualify for reimbursement from a first account;
   (C) determining that said credit card transaction would also qualify for reimbursement from a second account; and
   (D) determining, based at least in part on said transaction information, to reimburse at least a portion of said credit card transaction from said first account,
   wherein said system is configured to determine whether said first account includes sufficient finds to reimburse said credit card transaction; and in response to determining that said first account does not include sufficient finds to reimburse said credit card transaction, reimbursing at least a part of said credit card transaction from said second account.

43. A credit card transaction processing system that is configured for:
   (A) receiving transaction information regarding a credit card transaction related to a reimbursable charge made on a credit card by a credit card holder;
   (B) determining that said credit card transaction would qualify for reimbursement from a first account;
   (C) determining that said credit card transaction would also qualify for reimbursement from a second account; and
   (D) determining, based at least in part on said transaction information, to reimburse at least a portion of said credit card transaction from said first account based on an account transaction preference specified by said credit card holder in advance of said credit card transaction.

44. A credit card transaction processing system that is configured for:
   (A) receiving transaction information regarding a credit card transaction related to a reimbursable charge made on a credit card by a credit card holder;
   (B) determining that said credit card transaction would qualify for reimbursement from a first account;
   (C) determining that said credit card transaction would also qualify for reimbursement from a second account; and
   (D) determining, based at least in part on said transaction information, to reimburse at least a portion of said credit card transaction from said first account based on an account transaction preference specified by said credit card holder's employer in advance of said credit card transaction.

45. A credit card transaction processing system comprising:
   a computer processor; and
   a memory coupled to said computer processor, said credit card transaction processing system being configured for processing transactions made on a credit card that is issued to a cardholder and guaranteed by said cardholder's employer and configured for said cardholder, said cardholder's employer, and a plan service provider to access account information associated with said credit card, said cardholder accessing account information associated with said credit card via a cardholder interface, said employer accessing account information associated with said credit card via an employer interface, and said plan service provider accessing account information associated with said credit card via a plan service provider interface,
   wherein said cardholder is a first cardholder; said credit card is a first credit card; said account information is a first set of account information; and
   said credit card transaction processing system is further configured for allowing said cardholder's employer to access a second set of account information via said employer interface, said second set of account information being associated with a second credit card that is issued to a second cardholder, said second cardholder being an employee of said employer.

46. The credit card transaction processing system of claim 45, wherein said credit card is a consumer credit card.

47. The credit card transaction processing system of claim 45, wherein said account information comprises account balance information.

48. The credit card transaction processing system of claim 45, wherein: said second credit card is guaranteed by said employer.

49. The credit card transaction processing system of claim 45, wherein said system is configured for auto-substantiating certain charges made on said credit card, and for, in response to auto-substantiating a particular charge, reimbursing said particular charge from an account funded, at least in part, by said employer.

50. The credit card transaction processing system of claim 49, wherein said account is a travel-related account.

51. The credit card transaction processing system of claim 49, wherein said account is a parking related account.

52. The credit card transaction processing system of claim 49, wherein said account is an entertainment related account.

53. The credit card transaction processing system of claim 49, wherein said account is a flexible spending account.

54. The credit card transaction processing system of claim 49, wherein said account is a health reimbursement arrangement.

55. The credit card transaction processing system of claim 49, wherein said account is a health savings account.

56. The credit card transaction processing system of claim 49, wherein said account is a mass transit account.

57. The credit card transaction processing system of claim 49, wherein said account is a dependent care account.

58. The credit card transaction processing system of claim 49, wherein said system is configured for auto-substantiating said particular charge at least substantially without human intervention.

59. The credit card transaction processing system of claim 58, wherein said system is configured for reimbursing said particular charge at least substantially without human intervention.

* * * * *

UNITED STATES PATENT AND TRADEMARK OFFICE
CERTIFICATE OF CORRECTION

PATENT NO. : 7,661,586 B2
APPLICATION NO. : 10/980102
DATED : February 16, 2010
INVENTOR(S) : John J. Robbins, Jr., John J. Robbins, Sr. and Glen A. Hoffman Page 1 of 1

It is certified that error appears in the above-identified patent and that said Letters Patent is hereby corrected as shown below:

Column 14, line 67: "finds" should be changed to --funds--;
Column 15, line 3: "tans action," should be changed to --transaction,--;
Column 16, line 7: "finds" should be changed to --funds--; and
Column 16, line 10: "finds" should be changed to --funds--.

Signed and Sealed this

Twenty-third Day of March, 2010

David J. Kappos
*Director of the United States Patent and Trademark Office*